US011227579B2

(12) United States Patent
Nagano et al.

(10) Patent No.: US 11,227,579 B2
(45) Date of Patent: Jan. 18, 2022

(54) DATA AUGMENTATION BY FRAME INSERTION FOR SPEECH DATA

(71) Applicant: INTERNATIONAL BUSINESS MACHINES CORPORATION, Armonk, NY (US)

(72) Inventors: Toru Nagano, Tokyo (JP); Takashi Fukuda, Yokohama (JP); Masayuki Suzuki, Tokyo (JP); Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 16/535,829

(22) Filed: Aug. 8, 2019

(65) Prior Publication Data
US 2021/0043186 A1 Feb. 11, 2021

(51) Int. Cl.
*G10L 13/033* (2013.01)
*G10L 15/18* (2013.01)
*G06F 40/205* (2020.01)
*G06F 40/284* (2020.01)

(52) U.S. Cl.
CPC .......... *G10L 13/033* (2013.01); *G06F 40/205* (2020.01); *G06F 40/284* (2020.01); *G10L 15/18* (2013.01)

(58) Field of Classification Search
CPC ..... G10L 13/003; G10L 15/18; G06F 40/205; G06F 40/284
See application file for complete search history.

(56) References Cited

U.S. PATENT DOCUMENTS

| 5,642,466 A | * | 6/1997 | Narayan | G10L 13/10 704/200 |
| 5,729,694 A | * | 3/1998 | Holzrichter | G06Q 20/204 704/270 |
| 6,085,160 A | * | 7/2000 | D'hoore | G09B 19/06 704/2 |
| 6,133,904 A | * | 10/2000 | Tzirkel-Hancock | G06F 3/167 345/156 |
| 6,253,182 B1 | * | 6/2001 | Acero | G10L 13/10 704/258 |
| 6,950,798 B1 | * | 9/2005 | Beutnagel | G10L 13/07 704/258 |

(Continued)

FOREIGN PATENT DOCUMENTS

JP 2016011995 A 1/2016

OTHER PUBLICATIONS

Vachhani, et al. "Data Augmentation using Healthy Speech for Dysarthric Speech Recognition", Interspeech 2018, Sep. 2018, pp. 471-475.

(Continued)

*Primary Examiner* — Anne L Thomas-Homescu
(74) *Attorney, Agent, or Firm* — Tutunjian & Bitetto, P.C.; Randall Bluestone

(57) ABSTRACT

A technique for data augmentation for speech data is disclosed. Original speech data including a sequence of feature frames is obtained. A partially prolonged copy of the original speech data is generated by inserting one or more new frames into the sequence of the feature frames. The partially prolonged copy is output as augmented speech data for training an acoustic model for training an acoustic model.

16 Claims, 6 Drawing Sheets

(56) References Cited

U.S. PATENT DOCUMENTS

| | | | | |
|---|---|---|---|---|
| 6,975,987 | B1* | 12/2005 | Tenpaku | G10L 13/033 704/258 |
| 7,337,108 | B2* | 2/2008 | Florencio | G10L 21/04 704/208 |
| 10,026,407 | B1* | 7/2018 | Boucheron | G10L 19/032 |
| 10,062,374 | B2* | 8/2018 | Xiao | G10L 15/063 |
| 10,366,687 | B2* | 7/2019 | Zhan | G10L 17/02 |
| 2001/0056347 | A1* | 12/2001 | Chazan | G10L 13/07 704/258 |
| 2002/0038209 | A1* | 3/2002 | Brandel | G10L 21/04 704/207 |
| 2003/0009336 | A1* | 1/2003 | Kenmochi | G10L 13/07 704/258 |
| 2004/0068412 | A1* | 4/2004 | Chu | G10L 21/04 704/503 |
| 2004/0138888 | A1* | 7/2004 | Ramabadran | G10L 21/038 704/262 |
| 2005/0227657 | A1* | 10/2005 | Frankkila | G10L 21/04 455/255 |
| 2007/0271099 | A1* | 11/2007 | Kagoshima | G10L 13/047 704/258 |
| 2008/0140406 | A1* | 6/2008 | Burazerovic | G10L 13/00 704/260 |
| 2010/0131264 | A1* | 5/2010 | Ljolje | G06F 40/20 704/9 |
| 2014/0046656 | A1* | 2/2014 | Michaelis | G10L 21/02 704/201 |
| 2014/0372121 | A1* | 12/2014 | Togawa | G10L 13/027 704/254 |
| 2016/0372119 | A1* | 12/2016 | Sak | G10L 17/14 |
| 2017/0032244 | A1* | 2/2017 | Kurata | G06N 3/0472 |
| 2017/0098444 | A1* | 4/2017 | Song | G10L 15/02 |
| 2017/0169815 | A1* | 6/2017 | Zhan | G10L 15/07 |
| 2018/0121800 | A1* | 5/2018 | Kanda | G06N 3/0445 |
| 2018/0277143 | A1* | 9/2018 | Song | G10L 15/16 |
| 2018/0350347 | A1* | 12/2018 | Fukuda | G10L 15/063 |
| 2018/0350348 | A1* | 12/2018 | Fukuda | G10L 21/003 |
| 2019/0012594 | A1* | 1/2019 | Fukuda | G06N 3/0454 |
| 2019/0043482 | A1 | 2/2019 | Li et al. | |
| 2019/0108831 | A1* | 4/2019 | Fukuda | G10L 15/063 |
| 2020/0211550 | A1* | 7/2020 | Pan | G06N 3/08 |
| 2021/0014039 | A1* | 1/2021 | Zhang | H04L 9/0618 |
| 2021/0035563 | A1* | 2/2021 | Cartwright | G06N 7/005 |

OTHER PUBLICATIONS

Maekawa, "Corpus of Spontaneous Japanese: Its Design And Evaluation", ISCA & IEEE Workshop on Spontaneous Speech Processing and Recognition, Apr. 2003, 6 pages.

* cited by examiner

Algorithm 1 Prolongation perturbation

```
1:  X: an original array, X = {x_i} = {(x_{s_i}, x_{Δ_i}, x_{ΔΔ_i}, x_{L_i})}
2:  Y: a prolonged array, Y = {y_j} = {(y_{s_j}, y_{Δ_j}, y_{ΔΔ_j}, y_{L_j})}         210
3:  shift := 0
4:  for each frame i := 1 to |X| step 1 do
5:      j = i + shift
6:      y_j = x_i
7:      if isProlong(x_i) then                  INSERTION POSITION
                                                DETERMINATION 220
8:          shift = shift + 1
9:          j = i + shift
10:         y_j = createEmptyFrame()            PSEUDO FRAME
11:         y_{s_j} = {x_{s_i}, x_{s_{i+1}}} × {1/2, 1/2}^T   INSERTION 230
12:         y_{L_j} = x_{L_i}
13:         insertedPosition = j                DYNAMIC FEATURE
                                                RECALCULATION 240
14:     end if
15:     if j < insertedPosition + 3 then
16:         y_{Δ_{j-1}} = {y_{s_{j-2}}, y_{s_{j-1}}, y_{s_j}} × {1/2, 0, 1/2}^T
17:     end if
18:     if j < insertedPosition + 5 then
19:         y_{ΔΔ_{j-2}} = {y_{Δ_{j-3}}, y_{Δ_{j-2}}, y_{Δ_{j-1}}} × {1/2, 0, 1/2}^T
20:     end if
21: end for
```

FIG. 5

DATA AUGMENTATION BY FRAME INSERTION FOR SPEECH DATA

BACKGROUND

The present disclosure, generally, relates to data augmentation techniques for speech data, more particularly, to techniques for generating augmented data from original speech data.

Data augmentation is the technique of creating an altered copy of training data for increasing amount of a training dataset. Several augmentation techniques have been proposed for speech recognition, including reverberation, noise addition, volume perturbation, codec augmentation, vocal tract length (VTL) perturbation, tempo perturbation, speed perturbation, speech synthesis, stochastic feature mappings, etc. These augmented data are used for training and adaptation of an acoustic model for speech recognition.

Meanwhile, stretching of specific speech sounds such as vowels is a known phenomenon observed especially in informal conversation such as spontaneous conversation. It degrades accuracy of the speech recognition.

SUMMARY

According to an embodiment of the present invention, a computer-implemented method for data augmentation for speech data is provided. The method includes obtaining original speech data including a sequence of feature frames. The method also includes generating a partially prolonged copy of the original speech data by inserting one or more new frames into the sequence of feature frames. The method further includes outputting the partially prolonged copy as augmented speech data for training an acoustic model.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 5 shows pseudo code of a computer program product embodying data augmentation according to the exemplary embodiment of the present invention.

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for data augmentation for the training of an acoustic model based on a novel prolongation perturbation technique, in which original speech data is prolonged at frame level to generate a partially prolonged copy of the original speech data as augmented speech data.

Hereinafter, first referring to FIGS. 1, 2, and 3, a computer system for generating augmented speech data for the training of an acoustic model from original speech data based on a novel prolongation perturbation technique according to an exemplary embodiment of the present invention will be described. Then, referring to FIG. 4 and FIG. 5, a computer-implemented method for generating augmented speech data for the training of an acoustic model from original speech data based on a novel prolongation perturbation technique according to an exemplary embodiment of the present invention will be described. Then, experimental studies on the novel prolongation perturbation according to the exemplary embodiment of the present invention will be described. Finally, referring to FIG. 6, a hardware configuration of a computer system according to one or more embodiments of the present invention will be described.

Figure 1:
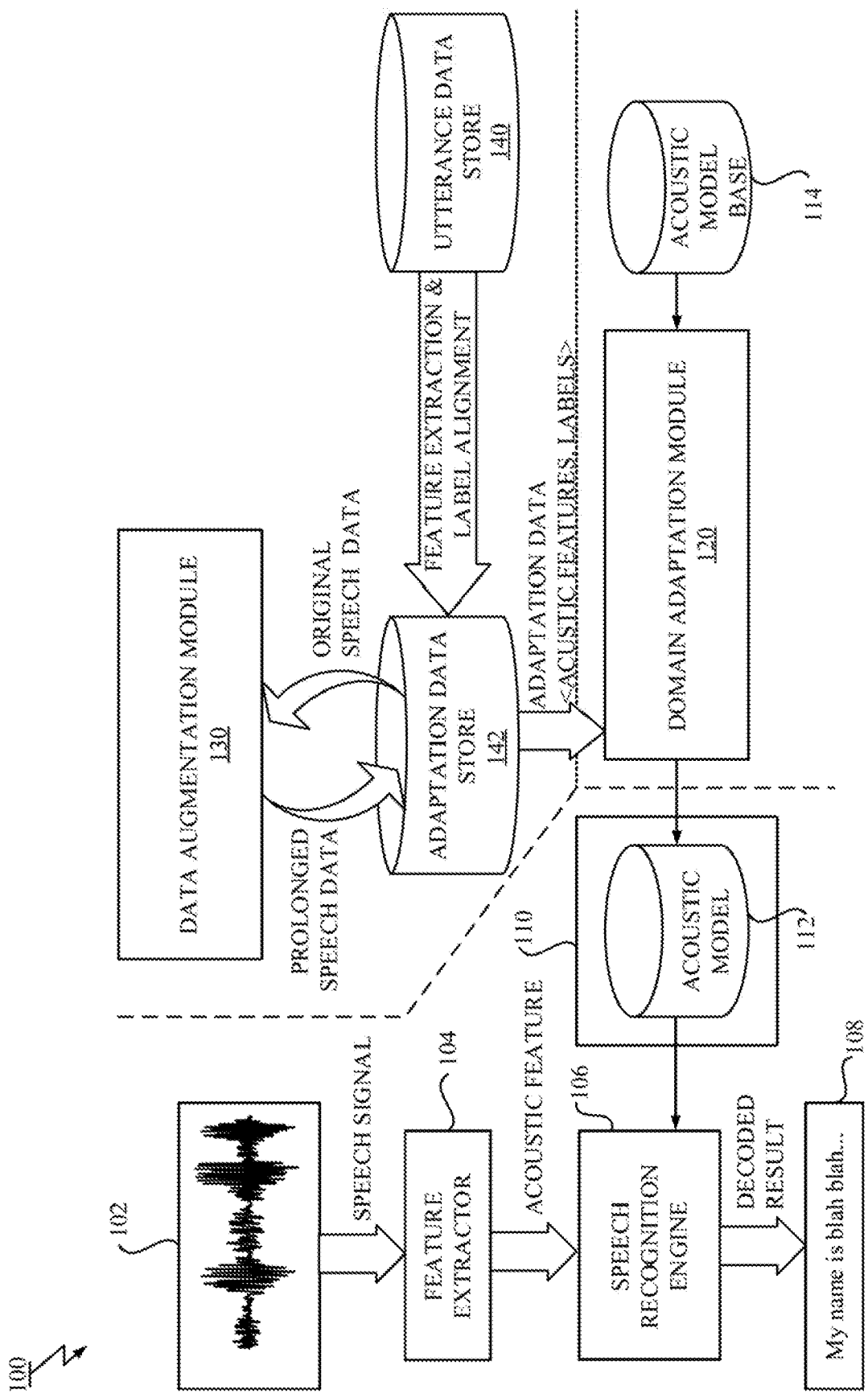
FIG. 1 illustrates a block diagram of a speech recognition system including a data augmentation module for augmenting speech data that may be used for training an acoustic model according to an exemplary embodiment of the present invention.

Referring to FIG. 1, a block diagram of a speech recognition system 100 including a data augmentation module 130 according to an exemplary embodiment of the present invention is illustrated.

As shown in FIG. 1, the speech recognition system 100 may include a feature extractor 104 for extracting acoustic features from an input; a speech recognition engine 106 for performing speech recognition based on a speech recognition model 110; a domain adaptation module 120 for performing domain adaptation to obtain an acoustic model 112 that constitutes the speech recognition model 110; and an utterance data store 140 for storing a collection of utterance data that is used for the domain adaptation. The speech recognition system 100 according to the exemplary embodiment of the present invention includes the data augmentation module 130 for augmenting speech data that is used for the domain adaptation.

The feature extractor 104 may receive, as an input, audio signal data 102 digitalized by sampling audio signal, which may be input from a microphone for instance, at a predetermined sampling frequency (sampling interval) and predetermined bit depth. The feature extractor 104 may also receive the audio signal data 102 from a remote client device through a network such as the internet. The feature extractor 104 is configured to extract acoustic features from the received audio signal data 102 by any known acoustic feature analysis to generate a sequence of the extracted acoustic features.

The acoustic features may include, but is not limited to, MFCC (Mel Frequency Cepstral Coefficient), LPC (Linear Predictive Coding) Coefficient, PLP (Perceptual Liner Prediction) Cepstral Coefficient, log Mel spectrum, or any combinations thereof. The acoustic features may further include dynamic acoustic features such as delta features and delta-delta features of the aforementioned (static) acoustic features.

Note that elements of the acoustic feature sequence are called as "frames" while the audio signal data 102 includes a series of sampled values of the audio signal. Generally, the audio signal data 102 is sampled at 8,000 Hz for narrowband audio and 16,000 Hz for broadband audio. The time duration of each frame in the acoustic feature sequence is longer than the sampling interval of the audio signal data 102 and may be approximately 20-30 msec.

The speech recognition engine 106 is configured to convert from the input sequence of the extracted acoustic features into a text. The speech recognition engine 106 predicts most plausible speech contents for the input sequence of the extracted acoustic features based on the speech recognition model 110 and outputs a decoded result 108.

The speech recognition model 110 includes the acoustic model 112. The acoustic model 112 is a model representing relationship between input acoustic features and linguistic units that constitutes a speech or utterance. The acoustic model 112 is a target of the domain adaptation performed by the domain adaptation module 120.

In a particular embodiment, the acoustic model 112 is an artificial neural network based acoustic model. The neural network for the acoustic model 112 may be based on any one of known neural network architectures, including a hybrid NN-HMM model, other type of NN-HMM model that is based on tandem or "bottleneck feature" approach. In the hybrid NN-HMM model, the neural network is used to directly compute observation probability distribution for each HMM state (e.g., mono-phone, tri-phone, quin-phone), instead of standard Gaussian Mixture Models (GMM) in the GMM/HMM system. The neural network may be any one of known architectures, including DNN (Deep Neural Network), CNN (Convolutional Neural Network), RNN (Recurrent Neural Network), LSTM (Long short-term memory)), etc. In tandem or "bottleneck feature" approach, the neural network is used to extract features as input for a subsequent system such as a standard GMM/HMM system and other neural network based system having different architecture or structure from the neural network, in place of or in addition to standard acoustic features. In other particular embodiment, the acoustic model 112 may be a conventional GMM/HMM system.

Although omitted in FIG. 1, the speech recognition model 110 may include a language model, which is a model representing probability distribution of word sequence and may be, but not limited to, n-gram model or neural network based model such as RNN. The speech recognition model 110 may include further dictionary that gives relationship between words and phonemes.

The speech recognition engine 106 finds a word sequence with maximum likelihood by using the speech recognition model 110 (including the acoustic model 112) based on the input sequence of the acoustic features, and outputs the word sequence found as the decoded result 108.

The domain adaptation module 120 is configured to perform the domain adaptation process by using given training data to build the acoustic model 112, which would be used by the speech recognition engine 106, from an already trained-acoustic model base 114. In the described embodiment, there is the utterance data store 140 that stores a collection of utterance data with transcriptions as a training data source. The utterance data includes a plurality of utterances and corresponding transcriptions. Note that the utterance data stored in the utterance data store 140 is given in a form of audio signal data that is the same as the audio signal data 102 for inference. The utterance data may be stored in an internal or external storage device operatively coupled to processing circuitry.

It is known that automatic speech recognition (ASR) degrades its performance when acoustic environment in target utterances is different from environment for the training data. Such acoustic environment includes not only a type of noises but also a speaking style. Spontaneous conversation, very fast and slow utterances and ambiguous pronunciation are well known as harmful speaking styles for speech recognition.

In order to adapt the already trained-acoustic model base 114 to a target domain, the collection of the original utterance data matched with the target domain is prepared for the domain adaptation. For example, when the adult spontaneous conversation is targeted, utterance data of adult spontaneous conversation may be prepared. Note that the target domain and the domain of the utterance data usually match each other and so the domain adaptation contributes to improve the ASR accuracy.

Furthermore, stretching of specific speech sounds such as vowel prolongations is a known phenomenon especially observed in informal conversation. The vowel prolongations are not observed frequently in the utterance data of read speech (reading of a given text), which may be easy to obtain as the training data since correct transcriptions corresponding to the read speech is already given. On the other hand, vowel prolongations are frequently observed in spontaneous conversations and casual presentations. But it is sometimes difficult to obtain correct transcriptions for such informal conversation.

In order to further improve the performance of the speech recognition for such informal or casual conversation, the data augmentation module 130 is configured to generate augmented speech data having a particular speaking style that is stretching of specific speech sounds such as vowel prolongation, by transforming original speech data into the augmented speech data. The data augmentation module 130 performs prolongation perturbation to stretch partially the original speech data.

The data augmentation module 130 according to the exemplary embodiment of the present invention performs data augmentation at frame level. Since the utterance data is given in the form of the audio signal data, before beginning the data argumentation by the data augmentation module 130, a sequence of acoustic features (hereinafter, a frame having the acoustic features is called as a feature frame) with labels that represents speech sounds (vowels, consonants, silence, etc.) is prepared from the utterance data stored in the utterance data store 140 by performing feature extraction and label alignment. The prepared data is stored in an adaptation data store 142 as adaptation data. Hereinafter, the data just prepared from the utterance data store 140 is called as original speech data.

The feature extraction for preparing the original speech data may be the same as that performed by the feature extractor 104 in a frontend process for the inference. The label alignment may be conducted by aligning a corresponding transcription to the sequence of feature frames based on any known technique such as forced alignment technique. By performing the label alignment, a correct label is assigned to each feature frame in the sequence. Hence, the adaptation data is prepared as a sequence of feature frames, each of which has acoustic features and a label.

Note that the label alignment may be done at least phoneme or mono-phone level (vowels, consonants, silence, etc.). It is not necessary to perform alignment at multi-phone level (e.g., tri-phone, quin-phone) for the purpose of the data augmentation. Also, for the purpose of the data augmentation, instead of aligning a phoneme label to each feature frame, a label may be assigned to each frame or each segment (including a plurality of frames) by detecting a segment corresponding to one of predetermined speech sounds. The predetermined speech sounds may include vowels and the detection may be conducted by vowel identification technique.

The data augmentation module 130 is configured to prolong original speech data at feature frame level to generate a partially prolonged copy of the original speech data as augmented speech data. The adaptation data store 142 stores the original speech data and the augmented speech data (the prolonged speech data) generated therefrom as the adaptation data for the domain adaptation module 120.

Figure 2:
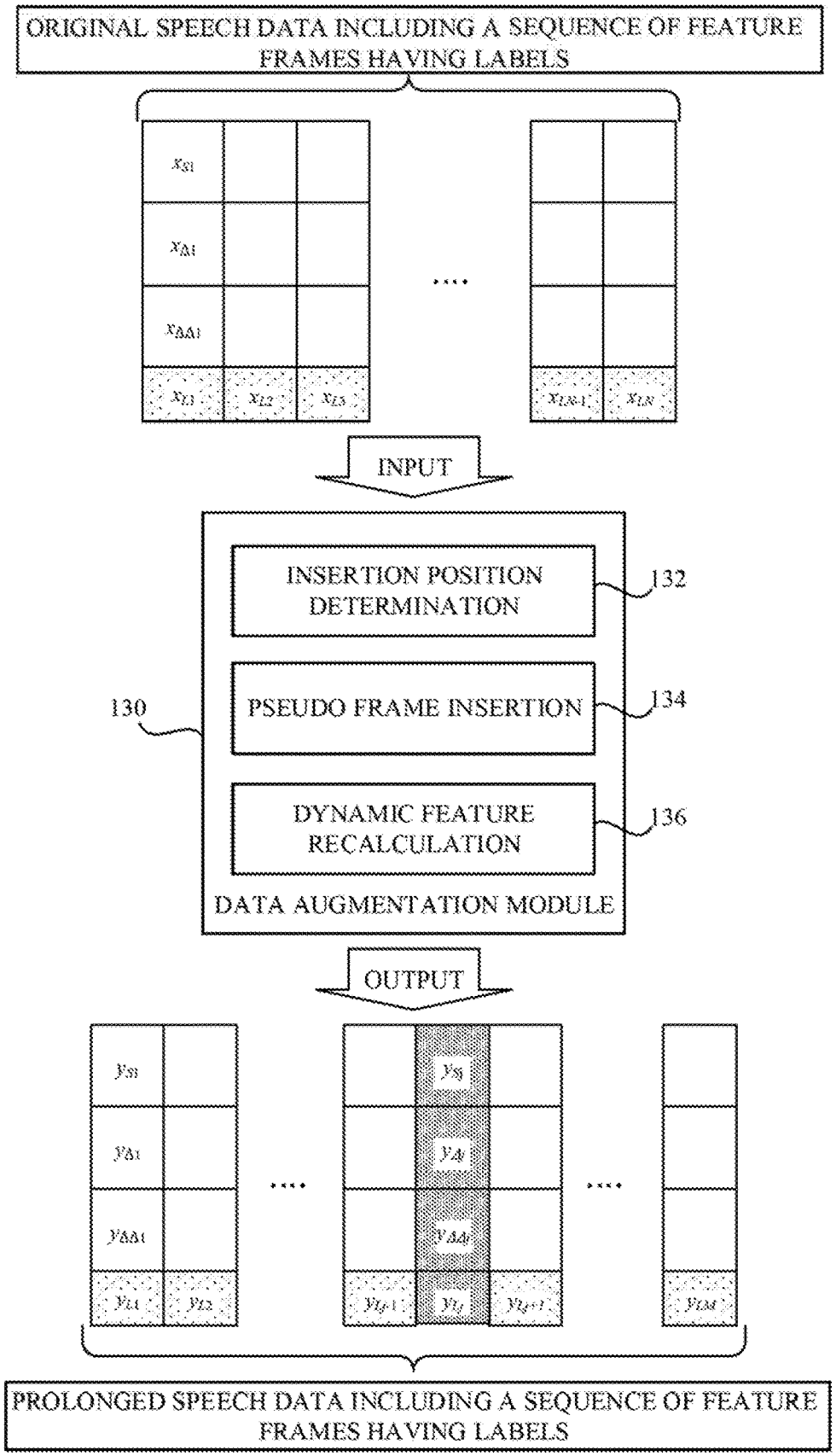
FIG. 2 shows a detailed block diagram of the data augmentation module according to the exemplary embodiment of the present invention.

Referring to FIG. 2, a detailed block diagram of the data augmentation module 130 is described. The data augmentation module 130 reads an input original speech data stored in the adaptation data store 142 to obtain a sequence of feature frames of the original speech data. The input original speech data includes a sequence of vector $\{x_i\}$ (={(static features $x_{si}$ (e.g., 40 dimensions), delta features $x_{\Delta i}$, (e.g., 40 dimensions), delta-delta features $x_{\Delta\Delta i}$ (e.g., 40 dimensions), a label $x_{Li}$ (e.g., 1 dimension))}), where the length of the original sequence X (={$x_1, \ldots, x_N$}) is N (N is an integer).

The output partially prolonged speech data may be stored to the adaptation data store 142. The output prolonged speech data includes a sequence of vector $\{y_i\}$ (={(static features $y_{si}$ (e.g., 40 dimensions), delta features $y_{\Delta i}$ (e.g., 40 dimensions), delta-delta features $y_{\Delta\Delta i}$, (e.g., 40 dimensions), a label $y_{Li}$ (e.g., 1 dimension))}), where the length of the prolonged sequence Y (={$y_1, \ldots, y_M$}) is M (M is an integer and M>N). In FIG. 2, $y_j$ corresponds to the inserted pseudo frame.

As shown in FIG. 2, the data augmentation module 130 may include an insertion position determination sub-module 132 for determining a position satisfying a criteria for frame insertion in the original speech data; a pseudo frame insertion sub-module 134 for inserting one or more new frames into the sequence of feature frames of the original speech data; a dynamic feature recalculation sub-module 136 for recalculating dynamic features for neighboring frames around each inserted new frame.

Note that the new frame inserted into the original sequence of feature frames is called as a pseudo frame, herein. Also note that the term "pseudo frame" means a frame that is not generated from actual original audio signal but artificially created so as to have similarity to preceding and/or succeeding frames.

The insertion position determination sub-module 132 is configured to determine positions for pseudo frame insertion in the original speech data based on a predetermined insertion criterion. The pseudo frame insertion sub-module 134 is configured to generate a partially prolonged copy of the original speech data by inserting one or more pseudo frames into the original sequence of feature frames at one or more positions that are determined by the insertion position determination sub-module 132.

In a particular embodiment, the predetermined insertion criterion defines inserting a pseudo frame with a predetermined probability at a position corresponding to a feature frame that has a label representing one of the vowels. That is because of the fact that the prolongation is often observed in vowel regions. This criterion (referred to as is-vowel criterion) enables the original speech data to be partly and selectively extended. The is-vowel criterion is described as a function that returns "True" if $x_{Li} \in \{\text{'a', 'i', 'u', 'e', 'o'}\}$ (in the case of Japanese phonemes labels) and Random( )<τ, where Random( ) is a function that returns a random value in a range [0, 1) and τ is an insertion ratio. Note that if the aforementioned alignment is performed at multi-phone level (e.g., tri-phone, quin-phone), $x_{Li}$ represents a center mono-phone unit in the multi-phone sequence. The determination as to whether the predetermined insertion criterion is satisfied is made for each frame position in the original sequence. If the criterion function returns "True", it means to insert the pseudo frame at the frame position.

The insertion ratio τ may be in a range of 0.1 to 0.4, more preferably 0.15 to 0.3. In a particular embodiment, a value of the insertion ratio τ is tuned by trying the domain adaptation with tentative values and by finding an optimal value that maximizes the accuracy of the ASR since the optimal value of the insertion rate T may be dataset-dependent.

Under the is-vowel criterion, each pseudo frame is inserted with the predetermined probability τ at the position corresponding to the processing frame in response to the processing frame being related to at least one of the vowels while scanning the feature frames in the sequence of the original speech data.

Figure 3:
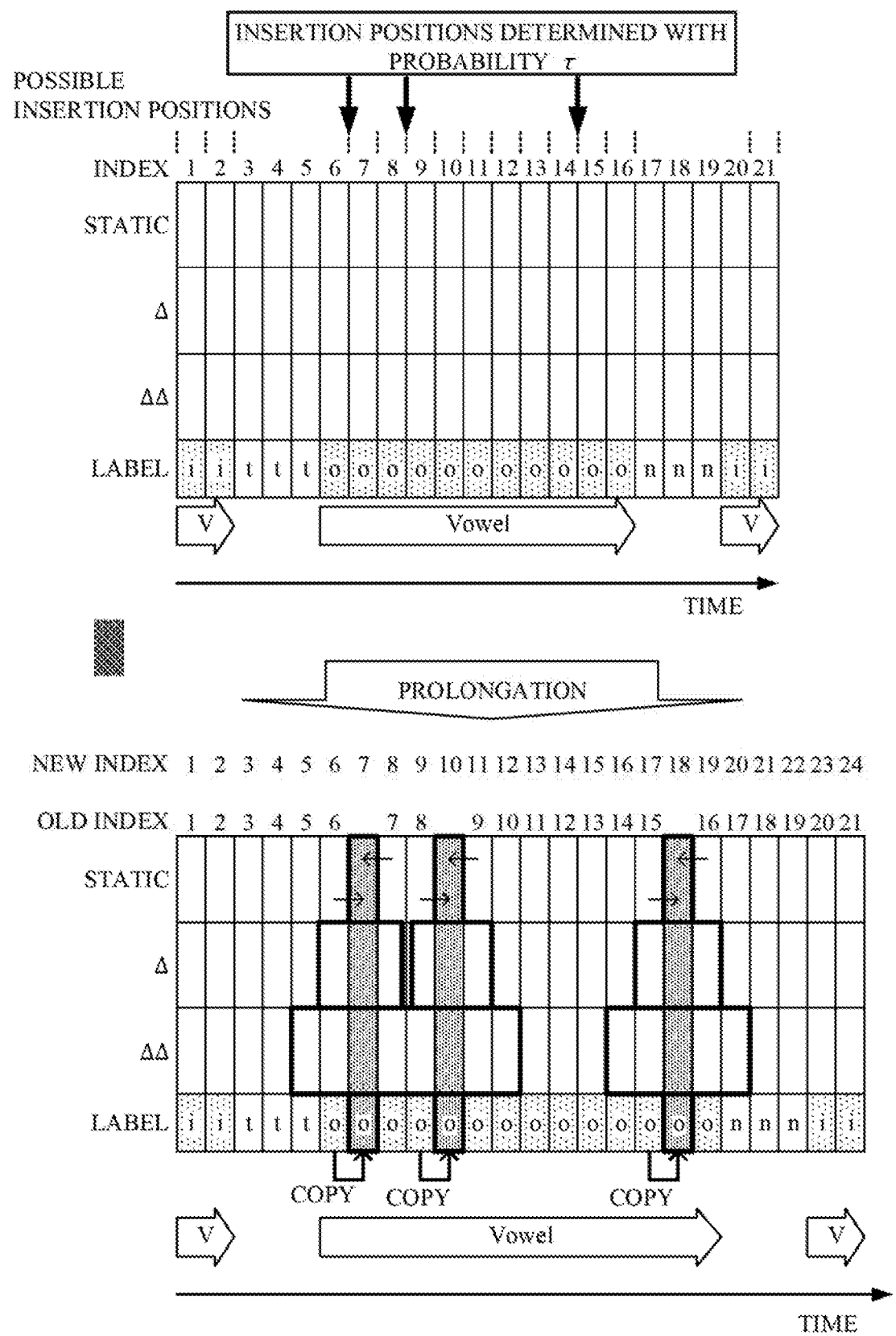
FIG. 3 shows a schematic of a way of inserting pseudo frames into positions satisfying a predetermined insertion criterion according to a particular embodiment of the present invention.

FIG. 3 shows a schematic of a way of inserting the pseudo frames into the positions satisfying the predetermined insertion criterion according to the particular embodiment of the present invention. A top diagram of FIG. 3 shows a schematic of the input sequence of the feature frames before the pseudo frame insertion. A bottom diagram of FIG. 3 shows a schematic of the output sequence of the feature frames after the pseudo frame insertion.

As indicated by dash lines in the top diagram of FIG. 3, there are several possible insertion positions, each of which corresponds to a next position of a feature frame that has a vowel label. Among these possible insertion positions, final insertion positions are determined with the predetermined probability τ.

Note that in the described embodiment, the possible insertion position corresponds to the next position of the feature frame that has the vowel label regardless of context around the feature frame. However, an additional criterion to determine the possible insertion position may also be contemplated. In other embodiment, a position related to consecutive frames having a specific pattern of labels is selected as the potential insertion position. For example, a next position of a central frame in consecutive three frames having a label pattern 'n-o-X (silence)' may be determined as the possible insertion position, where the center symbol represents a label of the central frame and the left and right symbols concatenated to the center symbol by hyphens represent labels of previous and subsequent frames.

As described above, each feature frame has the static acoustic features in the vector. Each pseudo frame has new values of the static acoustic features generated by interpolating previous and subsequent frames of the inserted pseudo frame, as illustrated by arrows in the bottom diagram of FIG. 3. In the described embodiment, linear interpolation is conducted by using one previous frame and one subsequent frame. Hence, the new values of the static acoustic features for the pseudo frame may be set to a mean (average) of the one previous frame and the one subsequent frame. However, the interpolation is not limited to the liner interpolation and the number of the frames incorporated in the interpolation calculation is not limited to two. One or more previous frames and/or one or more subsequent frames may be used with spline interpolation, polynomial interpolation, and the like, to calculate the new values of the static acoustic features for the inserted pseudo frame.

Also, each inserted pseudo frame is assigned a copy of a label assigned to a previous frame of the insertion position, as illustrated by angled arrows in the bottom diagram of FIG. 3. Alternatively, each inserted pseudo frame may have a copy of a label assigned to a subsequent frame of the insertion position.

When each feature frame has dynamic acoustic features in addition to the static acoustic features, inserting of the pseudo frame would affects the dynamic features of neighboring frames around the inserted pseudo frame since the dynamic features may represent a temporal change of lower order features (that are the static features for the delta features and the delta features for the delta-delta features).

The dynamic feature recalculation sub-module 136 is configured to recalculate updated values of the dynamic acoustic features for each neighboring frame around the inserted pseudo frame. When the dynamic acoustic features include the delta features and the delta-delta features, the recalculation of the delta-delta features is done for a group of neighboring frames wider than the delta features.

In the described embodiment, the delta features are recalculated for previous one frame and subsequent one frame (±1 neighboring frames) whereas the delta-delta features are recalculated for previous two frames and subsequent two frames (±2 neighboring frames), as illustrated by bold boxes in the bottom diagram of FIG. 3. The dynamic feature recalculation sub-module 136 is also configured to calculate new values of the dynamic acoustic features for each inserted pseudo frame.

Each feature frame has preferably dynamic acoustic features. However, if the circumstance permits, the dynamic acoustic features may be omitted. Note that when each feature frame does not have any dynamic acoustic features, the recalculation for each neighboring frame around the inserted pseudo frame is also omitted.

In the described embodiment with the predetermined insertion criterion, all vowels (e.g., 'a', 'i', 'u', 'e', 'o' for Japanese) are used as the predetermined speech sounds that limit the positions of the pseudo frame insertion. However, the predetermined speech sounds for limiting the pseudo frame insertion are not limited to the vowels. If a particular consonant or a particular group of consonants is known to be prolonged frequently in a certain language, the particular consonant or group may be included in the predetermined speech sounds. But this may be language-dependent.

Furthermore, in the described embodiment, the insertion ratio $\tau$ is fixed regardless of the insertion position and the specific speech sounds. However, in other embodiment, since the rate of the prolongation occurring at the initial, medial, and final positions is known to be different and the prolongation usually occurs at the end of words in a particular language, the insertion ratio $\tau$ may varies depending on relative frame position in each word segment. Also, if it is known that a certain speech sound is prolonged more frequently than other speech sounds the insertion ratio $\tau$ may be changed according to the specific speech sound of the label.

Since the one or more pseudo frames are inserted into the original sequence, the length of the prolonged sequence Y is extend to M from N by the number of the inserted frames, as indicated by new and old indexes in the bottom diagram of FIG. 3.

Referring back to FIG. 1, the data augmentation module 130 is configured to output the partially prolonged copy as augmented speech data to the adaptation data store 142. The domain adaptation module 120 may be configured to perform the domain adaptation to the trained-acoustic model base 114 by using the resultant augmented speech data solely or in combination with the original speech data and/or other speech data to obtain the acoustic model 112. When used in combination during training process of the domain adaptation, the resultant augmented speech data may be used randomly as a mixture with the original data and/or other speech data, may be used sequentially with the original data and/or other speech data, or may be used alternately with the original speech data and/or other speech data. The trained-acoustic model base 114 may be a general purpose acoustic model that has already been trained using other training dataset.

In a preferable embodiment, the resultant augmented speech data is used in combination with other augmented speech data generated by any known other augmentation techniques, including reverberation, noise addition, volume perturbation, codec augmentation, VTL perturbation, tempo perturbation, speed perturbation, speech synthesis, stochastic feature mappings, etc.

In the described embodiment, the domain adaptation is supervised adaptation since the training data source has a corresponding transcription, which may be transcribed by human experts and thus correct labels are available. However, unsupervised adaptation and semi-supervised adaptation are also contemplated. Note that unsupervised adaptation means using labels given by existing speech recognition engine as correct labels instead of using correct labels manually given by a human. Note that the domain adaptation is a kind of training of the acoustic model 112.

In particular embodiments, each of modules 104, 106, 120 and 130 described in FIG. 1 and each of sub-modules 132, 134 and 136 of the data augmentation module 130 described in FIG. 2 may be, but not limited to, implemented as a software module including program instructions and/or data structures in conjunction with hardware components such as a processor, a memory, etc.; as a hardware module including electronic circuitry; or as a combination thereof. These modules 104, 106, 120 and 130 described in FIG. 1 and sub-module 132, 134 and 136 described in FIG. 2 may be implemented on a single computer device such as a personal computer and a server machine or over a plurality of devices in a distributed manner such as a computer cluster of computer devices, client-server systems, and edge computing systems, cloud computing systems, etc. The utterance data store 140 and the adaptation data store 142 may be provided by using any internal or external storage device or medium, to which a processing circuitry of a computer system implementing the data augmentation module 130 is operatively coupled.

In FIG. 1, examples of boundaries between plural computer systems in the case where these modules 104, 106, 120 and 130 described in FIG. 1 and sub-module 132, 134 and 136 described in FIG. 2 are implemented over a plurality of computer systems are also illustrated by a dashed and a dot lines.

In a particular embodiment, as indicated by the dashed line in FIG. 1, the feature extractor 104, the speech recognition engine 106 and the speech recognition model 110 including the acoustic model 112 that is trained by the domain adaptation module 120 are implemented on a computer system of a user side while the data augmentation module 130 and the domain adaptation module 120 are implemented on a computer system of a provider side of speech recognition system. In a further variant embodiment, merely the feature extractor 104 is implemented on the user side and the speech recognition engine 106 and the speech recognition model 110 are implemented on the provider side. In this embodiment, the computer system of the client side merely transmits the sequence of the acoustic features to the computer system of the provider side and receives the decoded result 108 from the provider side. In other variant embodiment, all of the feature extractor 104, the speech recognition engine 106 and the speech recognition model 110 are implemented on the provider side and the computer system of the client side merely transmits the audio signal data 102 to the computer system of the provider side and receives the decoded result 108 from the provider side.

In other embodiments, the aforementioned components described to be implemented on the provider side of the speech recognition system (120, 130) may be further divided into different computer systems. In a particular embodiment, the data augmentation module 130 is merely implemented on a provider side of augmented data. The data augmentation module 130 generates a collection of augmented speech data from a given collection of original speech data and passes the collection of the augmented speech data to the provider sides of the speech recognition system. Since the data augmentation according to the exemplary embodiment of the present invention is performed at the feature frame level, an acoustic model including an input layer receiving one or more input feature frames (including a context of several consecutive frames) that are matched to the augmented speech data would be trained at the provider side of the speech recognition system by using the augmented speech data.

Note that in the described embodiment, the speech recognition system 100 is described as a model having traditional architecture, in which the acoustic model 112 and the language model that are built separately are used hierarchically. However, recently, end-to-end models that jointly learn the traditional components of the speech recognition system, including the acoustic model and the language model have been developed. Thus, the acoustic model 112 that is the target of the domain adaptation or the training is defined as a model that has capability to handle input acoustic features. Thus, the acoustic models to which the present data augmentation technique is applicable may include a traditional acoustic model as well as an end-to-end model incorporating the acoustic model functionality. Examples of such applicable acoustic models include, a sub-word unit end-to-end model and a word unit end-to-end model, and the like, in addition to traditional GMM/HMM, hybrid NN/HMM, bottleneck or tandem NN/HMM.

Hereinafter, referring to FIG. 4, a flowchart depicting a process for generating augmented speech data by inserting one or more pseudo frames into original speech data according to an exemplary embodiment of the present invention is shown. Note that the process shown in FIG. 4 may be performed by processing circuitry such as a processing unit of a computer system that implements the data augmentation module 130 shown in FIG. 1 and the sub-modules shown in FIG. 2.

Figure 4:
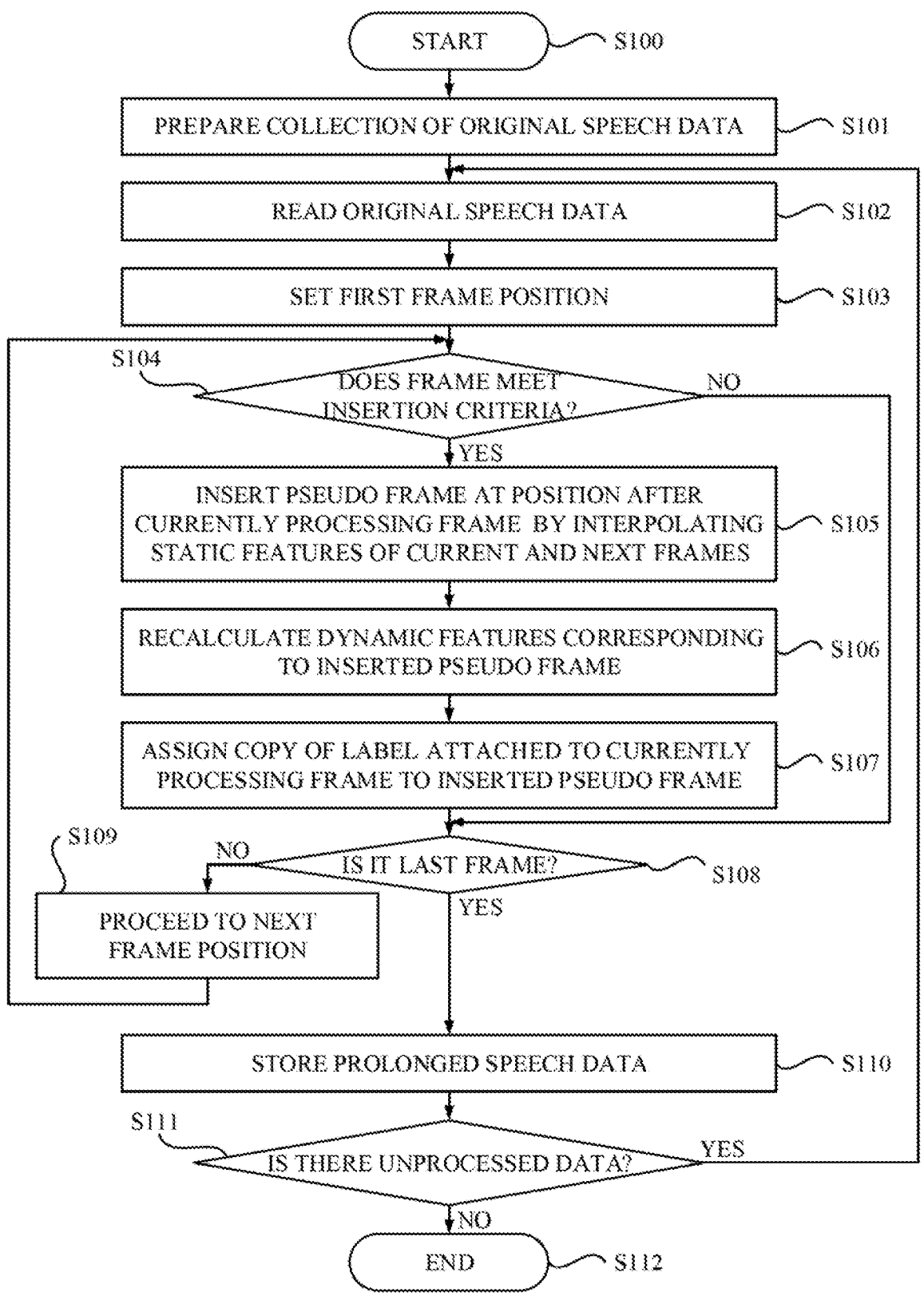
FIG. 4 is a flowchart depicting a process for generating augmented speech data by inserting one or more pseudo frames into original speech data according to an exemplary embodiment of the present invention.

The process shown in FIG. 4 may begin at step S100 in response to receiving a request for data augmentation from an operator, for example. Note that the process shown in FIG. 4 is described as a process performed for the given collection of the utterance data.

At step S101, the processing unit may prepare a collection of original speech data from the given collection of the utterance data in the utterance data store 140. The original speech data is generated by extracting acoustic features from audio signal data that includes a series of sampled values of audio signal. The original speech data includes a sequence of feature frames, each of which has a vector of acoustic features and a label. Each label is assigned by aligning a given transcription to the sequence of feature frames or by detecting a speech sound segment in the sequence of feature frames. The generated collection of the original speech data is stored into the adaptation data store 142.

At step S102, the processing unit may read one original speech data from the adaptation data store 142. At step S103, the processing unit may set the first frame position in the original speech data.

At step S104, the processing unit may determine, by the insertion position determination sub-module 132, whether the currently processing frame meets a predetermined insertion criterion or not. In the particular embodiment with the is-vowel criterion, in response to the position corresponding to the current frame being assigned any vowel label and the predetermined probability criteria being met, it is determined that the current frame meets the predetermined insertion criterion.

If the processing unit determines that the current frame meets the predetermined insertion criterion in step S104 (YES), the process may proceed to step S105.

At step S105, the processing unit may insert one pseudo frame at a position after the current frame by interpolating the static acoustic features of the previous and subsequent frames of the position (the current frame and its next frames). The inserted pseudo frame has a new value of the static acoustic features generated by the interpolation.

At step S106, the processing unit may recalculate updated values of the dynamic acoustic features for each neighboring frame around each inserted pseudo frame. If the dynamic acoustic features include delta features and delta-delta features, the recalculating for the delta-delta features is done for a group of neighboring frames wider than the delta features. In the described embodiment, the delta features are recalculated for previous one frame and subsequent one frame (±1 neighboring frames) and the delta-delta features are recalculated for previous two frames and subsequent two frames (±2 neighboring frames). The new values of the dynamic acoustic features for each inserted pseudo frame are also calculated in step S106.

At step S107, the processing unit may assign a copy of a label of the previous frame of the position (i.e., the currently processing frame) to the newly inserted pseudo frame, and the process may proceed to step S108.

Referring back to step S104, when the processing unit determines that the current frame does not meet the predetermined insertion criterion in step S104 (NO), the process may directly proceed to step S108.

At step S108, the processing unit may determine whether the current frame corresponds to a last frame of the currently processing original speech data or not. If the processing unit determines that the current frame dose not reach the last frame of the data in step S108 (NO), the process may branch to step S109. At step S109, the processing unit may proceed to a next frame position and loop back to step S104 for processing the subsequent frame. On the other hand, if the processing unit determines that the current frame reaches the last frame of the data in step S108 (YES), the process may proceed to step S110.

By iteratively performing the processing through steps S102 to S109 for each frame in one original speech data, the partially prolonged copy of the currently processing original speech data is generated. At step S110, the processing unit may store (or output) the partially prolonged copy into the adaptation data store 142 as augmented data.

At step S111, the processing unit may determine whether there is any unprocessed data or not. If the processing unit determines that unprocessed original speech data remains in the adaptation data store 142 in step S111 (YES), the process may loop back to step S102 for processing remained original speech data. On the other hand, if the processing unit determines that there is no unprocessed data in the adaptation data store 142 any more in step S111 (NO), the process may proceed to step 112, and end at step S112.

After completion of the process shown in FIG. 4, the processing unit may perform adaptation (or training) of the acoustic model using the augmented speech data solely or in combination with the original speech data and/or other speech data.

Referring to FIG. 5, pseudo code of a computer program product that embodies data augmentation method according to the exemplary embodiment of the present invention is described.

In the pseudo code 200, the portion of the code 210 of lines 4-21 defines a for loop of scanning the feature frames in the original speech data. The portion of the code 220 of lines 7 and 14 defines a branch under the predetermined insertion criterion, where the function "isProlong($x_i$)" represents the aforementioned criteria function, which is depending on the specific insertion criterion. In the is-vowel criterion, the function isProlong ($x_i$) returns "True" if $x_{Li}$ is any vowel and Random( )<τ.

The portion of the code 230 of lines 8-13 defines inserting a pseudo frame by the linear interpolation of the currently processing frame (i) and the subsequent frame thereof (i+1) in terms of the static acoustic features. The pseudo frame has a mean of the static acoustic features of the currently processing frame ($x_{si}$) and the subsequent frame ($x_{si+1}$). The inserted pseudo frame has the same label as the currently processing frame ($y_{Li}=x_{Li}$).

The portion of the code 240 of lines 15-20 defines recalculation (or calculation) of the dynamic acoustic features. More specifically, the lines 15-17 define recalculation (or calculation) of the delta features whereas the lines 18-20 define recalculation (or calculation) of the delta-delta features.

Note that in the aforementioned embodiments, the dynamic acoustic features for the original speech data were given before the data augmentation and the dynamic acoustic features for the augmented speech data were at least partially recalculated during the process of the data augmentation. However, the way of calculating the dynamic features is not limited. In other embodiment, the original speech data with empty dynamic features are given and values of the dynamic acoustic features for both of the augmented speech data and the original speech data were calculated during the cause of the data augmentation.

According to the aforementioned embodiments, by generating augmented data that simulates the stretching of the specific speech sounds such as vowel prolongations, the performance of the speech recognition using the acoustic model that has been adapted with the augmented data is expected to be improved especially for informal, casual and/or spontaneous conversations, presentations, or utterances without any harmful side effect on performance for normal utterance, as also demonstrated in the experimental results described later.

Since the speech data originating from the collection of the original utterance data matching the target domain is prepared for the domain adaptation, the augmented speech data is also expected to match the target domain and the obtained acoustic model 112 is expected to have improved accuracy for the audio signal data 102 of the target domain than the trained-acoustic model base 114.

As described above, for the purpose of the domain adaptation, the target domain and the domain of the utterance data usually match each other. However, in the domain adaptation with the augmented speech data generated by the novel prolongation perturbation, it is not necessary that the target domain and the domain of the utterance data match completely each other, as also demonstrated in the experimental results described later. For example, when the child spontaneous conversation is the target domain, utterance data of spontaneous conversation done by adult females may be prepared solely or in combination with the utterance data of the child spontaneous conversation. As will be demonstrated in the experimental results described later, the performance of the speech recognition using the adapted acoustic model would be improved for child spontaneous conversations even though the adaptation data includes merely the utterance data of the spontaneous conversation done by the adult females.

In the described embodiment, the resultant augmented speech data has been described to be used as the adaptation data to adapt the trained-acoustic model base 114 to the target domain. However, the type of the training using the augmented speech data to which the novel prolongation perturbation is applicable is not limited. In other particular embodiment, instead of using the domain adaptation module 120, a training module performs training of the acoustic model 112 from scratch by using a collection of training speech data that includes the resultant augmented speech data.

Since the prolonged speech data are made by inserting pseudo frames at feature frame level, the computational cost becomes low and the inserted pseudo frames affect merely limited regions in the original speech data. It is possible to omit recalculating of the static features from the original waveforms and regenerating of the alignments from a series of feature vectors, which is generally needed for conventional tempo and speed perturbation methods. Note that both of the conventional tempo and speed perturbation methods are audio-level speech augmentation methods that directly modify the audio signal data and change the speed or tempo of the original utterance, producing altered copies of the original utterance data. The altered copy of the original utterance data generated by the tempo or speed perturbation is prolonged uniformly in whole. Also many acoustic features of the original speech data remain in the prolonged copy, unlike the conventional tempo and speed perturbation methods. The pseudo frame insertion introduces a little noise into the original speech data. Thus, the performance of the speech recognition is expected to benefit from further other augmentation technique such as noise addition techniques.

Note that the languages to which the novel prolongation perturbation according to the embodiments of the invention is applicable is not limited and such languages may include, by no means limited to, Arabic, Chinese, English, French, German, Japanese, Korean, Portuguese, Russian, Swedish, Spanish for instance.

Experimental Studies

A program implementing the data augmentation module 130 shown in FIG. 1 and FIG. 2 and the data augmentation process shown in FIG according to the exemplary embodiment was coded and executed for given data collections. For each collection, a set of given data was divided into two groups of data: adaptation data and test data. The set of the adaptation data was used for the domain adaptation to an already trained baseline acoustic model (corresponding to the trained-acoustic model base 114 in FIG. 1).

Baseline Model

As a baseline acoustic model, a broadband (16 kHz sampling frequency) CNN (Convolutional Neural Network)-based acoustic model trained on approximately 2K hours of Japanese broadband speech from various sources was used. The CNN-based acoustic model was trained using various speeches with a 40 dimensional log-mel-frequency spectra augmented with Δ and ΔΔ features as input acoustic features. The log-mel-frequency spectra were extracted by applying mel scale integrators to power spectral estimates in short analysis windows (25 msec) of the signal, followed by the log transformation. Each frame of speech was also appended with a context of 11 consecutive frames after applying a speaker independent global mean and variance normalization. The CNN-based acoustic model used two convolutional layers with 128 and 256 hidden nodes each in addition to four fully-connected layers having 2048 nodes per layer to estimate the posterior probabilities of 9300 output targets. All of the 128 nodes in the first feature-extracting layer were attached with 9×9 filters, which were two-dimensionally convoluted with the input log mel-filter bank representation. The second feature-extracting layer, which had 256 nodes, had a similar set of 3×4 filters that processed the non-linear activations after max pooling from the preceding layer. The nonlinear outputs from the second feature-extracting layer were then passed onto the subsequent fully connected layers. All layers used sigmoid non-linearity.

After adaptation, the CNN-based acoustic models (each corresponding to the acoustic model 112 in FIG. 1) were used together with a trigram language model. The vocabulary contained 300K words and the language model had 300M trigrams.

Unless otherwise noted, any portions of the speech recognition model except for contents of adaptation data for domain adaptation of the acoustic model were approximately identical between examples and comparative examples. The final topology of the neural network in the examples was also identical to that of the comparative examples. The subsequent adaptation method after the data augmentation in the example was also identical to that of the comparative examples other than baseline.

Data Collections

The novel data augmentation technique was tested in a series of experiments using a number of datasets for acoustic model adaptation. In a first set of experiments, the training of various models was explored using multiple adaptation methods, including the novel data augmentation techniques and other conventional augmentation techniques. Four datasets including two examples from real spontaneous conversation datasets and two examples from read speech datasets were used. Characteristics of the datasets were as follows:

SP-Adult (Interviews): The data contained a set of conversations between interviewers and interviewees. The subject of the interview was decided in advance. The speaking style and content were not restricted, and these conversations were mostly spontaneous. This speech was recorded in a studio.

SP-Child (Discussions): The data contained a set of discussions between three students in a class of junior high school. The subject of the discussion was given by a teacher in advance. The data transcribed from three classes' recordings was used. The students in each class were different. Two classes were used for the acoustic model adaptation and one for the test.

RD-Adult (Reading stories): The data contained read speech from a provided text. The adult speakers read simple stories in a silent room.

RD-Child (Reading short sentences): The data contained short sentences read by children ranging from elementary school age to high school students.

Experiment 1 (Supervised Adaptation Through in-Domain Data Augmentation)

To evaluate the novel prolongation perturbation technique, the acoustic domain adaptation experiments were performed, in which cross-entropy adaptation was applied to the datasets in a manner based on weight decay. The weight decay-based regularizer along with the standard cross-entropy criteria outperformed the simple adaptation method (fine-tuning) with various parameter settings.

The number of training and test hours for the datasets is summarized in Table 1.

TABLE 1

|  | SP-Adult | SP-Child | RD-Adult | RD-Child |
| --- | --- | --- | --- | --- |
| Adaptation data | 10.20 hours | 2.70 hours | 4.42 hours | 8.90 hours |
| Test data | 0.48 hours | 1.93 hours | 1.20 hours | 2.00 hours |
| Total | 10.68 hours | 4.63 hours | 5.62 hours | 10.90 hours |

As described in Table 1, the adaptation data ranged from 2.7 hours to 10.2 hours of manually transcribed spontaneous conversation and read speech. Between 0.5 hours and 2 hours from the same dataset were used as the test data for the experiments. The character error rate (CER) was used as the evaluation metrics because there is ambiguity in Japanese word segmentation.

Four different adaptation methods were examined, including no augmentation (Comparative Example 2), tempo perturbation (Comparative Example 3), speed perturbation (Comparative Example 4), and prolongation perturbation with is-vowel criteria (Example 1). Note that the baseline model corresponds to Comparative Example 1. In Example 1 and Comparative Examples 3 & 4 (other than the baseline and the no augmentation), the adaptation data is a mixture of the original speech data set and the augmented speech data obtained by respective methods.

The no augmentation (Comparative Example 2) used merely the original adaptation data. The tempo perturbation (Comparative Example 3) and the speed perturbation (Comparative Example 4) were conducted by using Sox (http://sox.sourceforge.net/), an audio manipulation tool. This tool directly modified the speech signal at audio level and changed the speed and tempo of the original speech, producing altered copies of the original speech data. Two additional altered sets of data for tempo perturbation were created by modifying the tempo to ×0.9 and ×1.1 of the original tempo rate using the Sox tempo function. The number of the sampled frame was changed to 1c/0.9=1.11c and 1c/1.1=0.90c when c denotes the original data size. So the alignment of the tempo modified data was regenerated. The pitch was not changed by the tempo perturbation. In a similar way, two additional copies of the original adaptation data were created for speed perturbation by modifying the speed to ×0.9 and ×1.1 of the original speed rate using Sox speed function. The alignment of the speed modified data was also regenerated. The pitch was changed by the speed augmentation.

The evaluated results of the example and the comparative examples using four datasets are summarized in Table 2.

TABLE 2

| Adaptation method | Data Size | SP-Adult CER(%) (rel.) | SP-Child CER(%) (rel.) | RD-Adult CER(%) (rel.) | RD-Child CER(%) (rel.) |
|---|---|---|---|---|---|
| Baseline (Comparative Example 1) | 0.0 | 26.51 | 56.75 | 10.32 | 23.85 |
| No augmentation (Comparative Example 2) | 1.0 | 26.32 (—) | 49.49 (—) | 7.00 (—) | 22.25 (—) |
| Tempo Perturbation (Comparative Example 3) | 3.0 | 25.98 (1.29) | 49.43 (0.12) | 6.75 (3.57) | 22.22 (0.13) |
| Speed Perturbation (Comparative Example 4) | 3.0 | 25.67 (2.46) | 48.78 (1.42) | 6.85 (2.14) | 22.02 (1.03) |
| Prolongation with is-vowel criteria (Example 2) | <2.2 | 24.55 (6.72) | 48.48 (2.04) | 6.77 (3.28) | 22.22 (0.13) |

(rel.) represents relative improvement (%).

In Table 2, the SP-Adult column shows the CER of various adaptation datasets. The no augmentation (Comparative Example 2) gained 0.19% absolute in comparison with the baseline (Comparative Example 1), but the improvements were relatively small. Further improvement was seen when data from the tempo perturbation was applied (Comparative Example 3). The accuracy of the speed perturbation (Comparative Example 4) improved more than that of the tempo perturbation data augmentation (Comparative Example 3).

Using prolongation augmentation (Example 1) resulted in further improvement compared with using the speed and tempo augmentation in isolation (Comparative Examples 3 &4). In the experiment, the insertion ratio τ was set to 0.2. The amount of adaptation data used was less than 2.2c in the case of the is-vowel criteria although the size varied depending on the original data. While in SP-Adult 50.2% of the original data was labeled "vowel", the total amount of adaptation data was 2.10c (=1c+1.10c). The total amount of adaptation data for prolongation adaptation was almost the same among the datasets. Vowel/consonant ratio was about 1.4 for all of the datasets.

The SP-Child column also shows further improvements when using the speed and the tempo augmentation in isolation (Comparative Examples 3 & 4). The improvements by the novel prolongation perturbation on the RD-Adult and RD-Child datasets were comparable with those of the tempo perturbation or the speed perturbation.

Experiment 2 (Supervised Adaptation Through Out-of-Domain Data Augmentation)

This experiment involved adapting a female adult voice set to a spontaneous child dataset (SP-Child). Since adult female speech is more similar to child speech than adult male speech, and gender-selected adult training data is expected to be much more beneficial to results. It is hypothesized that applying a prolonged female voice would result in more effective adaptation data for modification because it simulated the effect of the information that is missing from the original female voice data.

The Corpus of Spontaneous Japanese (CSJ) (K. Maekawa, "Corpus of Spontaneous Japanese: its design and evaluation" in Proceedings of The ISCA & IEEE Workshop on Spontaneous Speech Processing and Recognition (SSPR 2003), 2003, pp. 7-12.) is a large scale database of spontaneous Japanese, which includes academic presentation speech combined with metadata such as the age and gender of the presenter. Speech data of young female was collected from the CSJ and made a subset of the CSJ-F dataset. In cases where speakers made more than two presentations, the first presentation was used to avoid data bias. The amount of CSJ-F data was 5.86 hours. The data and adaptation data were derived from different sources. The test data was from SP-Child, and the adaptation data was from CSJ-F.

As similar to Experiment 1, four different adaptation methods were examined, including no augmentation (Comparative Example 6), tempo perturbation (Comparative Example 7), speed perturbation (Comparative Example 8), and prolongation perturbation with the is-vowel criteria (Example 2). Note that the baseline model corresponds to Comparative Example 4.

The evaluated results of the examples and the comparative examples using CSJ-F dataset are summarized in Table 3.

TABLE 3

| Adaptation method | Data Size | SP-Child CER(%) | Relative Improvement(%) |
|---|---|---|---|
| Baseline (Comparative Example 5) | 0.0 | 56.75 | |
| No augmentation (Comparative Example 6) | 1.0 | 55.25 | — |
| Tempo Perturbation (Comparative Example 7) | 3.0 | 55.49 | 0.43 |
| Speed Perturbation (Comparative Example 8) | 3.0 | 54.92 | 0.59 |
| Prolongation with is-vowel criteria (Example 2) | <2.2 | 54.38 | 1.57 |

Using the no augmentation (Comparative Example 6) with the CSJ-F dataset improved the accuracy by 1.5% CER compared with the baseline (Comparative Example 5), although this improvement was relatively small compared to that of the no augmentation (Comparative Example 2) using SP-Child data (as described in Table 2). Using prolonging augmentation with the is-vowel criteria (Example 2) enabled further accuracy improvements (relative 1.57%) compared with the tests conducted on speed and tempo augmentation (Comparative Examples 7 & 8).

Summary

In the aforementioned experiments, it was demonstrated that the novel prolongation perturbation technique performed well and provided a relative improvement of up to 6.72% for spontaneous adult data and a relative improvement of 3.04% on average over baseline adaptation performances. The novel prolongation augmentation also outperformed 1.28% on average compared to speed perturbation.

It was also demonstrated that the novel prolongation augmentation has a low implementation cost and a low computational cost (without need of regeneration of label alignment, etc.) and needs less perturbation data.

Computer Hardware Component

Figure 6:
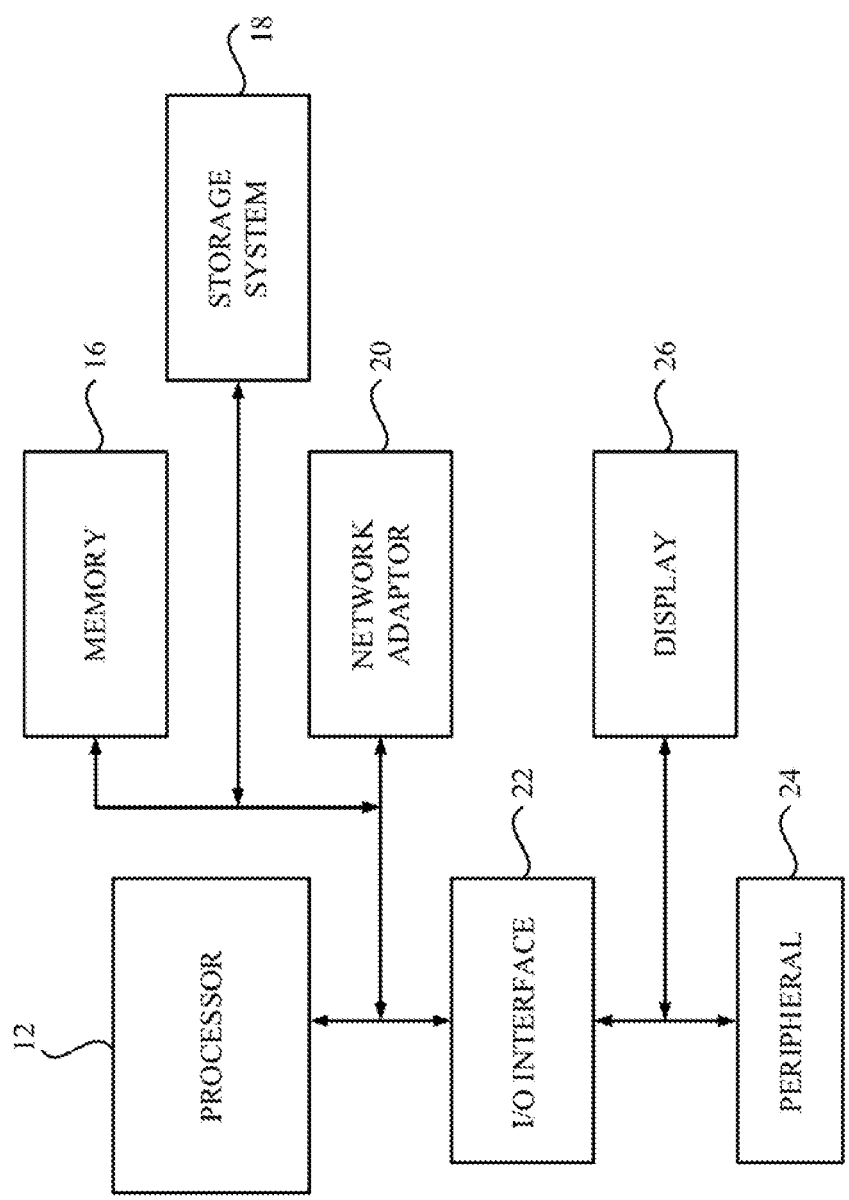
FIG. 6 depicts a schematic of a computer system according to one or more embodiments of the present invention.

Referring now to FIG. 6, a schematic of an example of a computer system 10, which can be used for the speech recognition system 100, is shown. The computer system 10 shown in FIG. 6 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data augmentation for speech data, the method comprising:
   obtaining original speech data including a sequence of feature frames, each having dynamic acoustic features that include delta features and delta-delta features;
   generating a partially prolonged copy of the original speech data by inserting one or more new frames into the sequence of feature frames, including calculating updated values of the dynamic acoustic features for each neighboring frame around each inserted new frame, with the calculation for the delta-delta features being done for a group of neighboring frames wider than the delta features; and outputting the partially prolonged copy as augmented speech data for training an acoustic model.

2. The method of claim 1, wherein the sequence of feature frames of the original speech data has labels representing speech sounds and each new frame is inserted at a position corresponding to a processing frame in response to the processing frame being related to at least one of predetermined speech sounds.

3. The method of claim 2, wherein the predetermined speech sounds includes one or more vowels.

4. The method of claim 2, wherein each new frame is inserted with a predetermined probability at the position corresponding to the processing frame related to the at least one of the predetermined speech sounds.

5. The method of claim 1, wherein each feature frame has static acoustic features and each new frame has new values of the static acoustic features generated by interpolating previous and subsequent frames.

6. The method of claim 2, wherein each new frame has a copy of a label assigned to a previous or subsequent frame thereof.

7. The method of claim 1, wherein the method further comprises:
training the acoustic model using the augmented speech data solely or in combination with the original speech data and/or other speech data, the acoustic model including an input layer receiving one or more input feature frames.

8. The method of claim 2, wherein the sequence of feature frames of the original speech data is generated by extracting acoustic feature from audio signal data including a series of sampled values of audio signal and each feature frame has a label assigned by aligning a transcription to the sequence of feature frames or by detecting a speech sound segment in the sequence of feature frames.

9. A computer system for data augmentation for speech data, by executing program instructions, the computer system comprising:
a memory storing the program instructions;
processing circuitry in communications with the memory for executing the program instructions, wherein the processing circuitry is configured to:
obtain original speech data including a sequence of feature frames, each having dynamic acoustic features that include delta features and delta-delta features;
generate a partially prolonged copy of the original speech data by inserting one or more new frames into the sequence of feature frames, including calculation of updated values of the dynamic acoustic features for each neighboring frame around each inserted new frame, with the calculation for the delta-delta features being done for a group of neighboring frames wider than the delta features; and
output the partially prolonged copy as augmented speech data for training an acoustic model.

10. The computer system of claim 9, wherein the sequence of feature frames of the original speech data has labels representing speech sounds and each new frame is inserted at a position corresponding to a processing frame in response to the processing frame being related to at least one of predetermined speech sounds.

11. The computer system of claim 10, wherein each new frame is inserted with a predetermined probability at the position corresponding to the processing frame related to the at least one of the predetermined speech sounds.

12. The computer system of claim 10, wherein each feature frame has static acoustic features, and each new frame has new values of the static acoustic features generated by interpolating previous and subsequent frames.

13. A computer program product for data augmentation for speech data, the computer program product comprising a computer readable storage medium having program instructions embodied therewith, the program instructions executable by a computer to cause the computer to perform a computer-implemented method comprising:
obtaining original speech data including a sequence of feature frames, each having dynamic acoustic features that include delta features and delta-delta features;
generating a partially prolonged copy of the original speech data by inserting one or more new frames into the sequence of feature frames, including calculating updated values of the dynamic acoustic features for each neighboring frame around each inserted new frame, with the calculation for the delta-delta features being done for a group of neighboring frames wider than the delta features; and
outputting the partially prolonged copy as augmented speech data for training an acoustic model.

14. The computer program product of claim 13, wherein the sequence of feature frames of the original speech data has labels representing speech sounds and each new frame is inserted at a position corresponding to a processing frame in response to the processing frame being related to at least one of predetermined speech sounds.

15. The computer program product of claim 14, wherein each new frame is inserted with a predetermined probability at the position corresponding to the processing frame related to the at least one of the predetermined speech sounds.

16. The computer program product of claim 13, wherein each feature frame has static acoustic features, and each new frame has new values of the static acoustic features generated by interpolating previous and subsequent frames.

* * * * *